United States Patent

Pak

[11] Patent Number: 5,905,602
[45] Date of Patent: *May 18, 1999

[54] REPEAT REPRODUCTION METHOD FOR MAGNETIC TAPE

[75] Inventor: Yeong-il Pak, Suwon, Rep. of Korea

[73] Assignee: Samsung Electronics Co., Ltd., Kyungki-do, Rep. of Korea

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/905,894

[22] Filed: Aug. 4, 1997

Related U.S. Application Data

[60] Continuation of application No. 07/981,129, Nov. 24, 1992, abandoned, which is a division of application No. 07/398,888, Aug. 28, 1989.

[30] Foreign Application Priority Data

Dec. 31, 1988 [KR] Rep. of Korea ............ 88-18088

[51] Int. Cl.$^6$ .................................................. G11B 15/20
[52] U.S. Cl. ............................... 360/74.4; 360/72.2
[58] Field of Search .................. 360/27, 71, 72.1–3, 360/74.4

[56] References Cited

U.S. PATENT DOCUMENTS

| | | | |
|---|---|---|---|
| 4,463,393 | 7/1984 | Ueki et al. ................ | 360/72.2 X |
| 4,628,377 | 12/1986 | Harigaya ................... | 360/72.3 X |
| 4,630,137 | 12/1986 | Sekiguchi ................. | 360/71 X |
| 4,638,389 | 1/1987 | Barth ........................ | 360/72.1 |
| 4,691,251 | 9/1987 | Ookawa et al. ........... | 360/72.1 X |
| 4,897,742 | 1/1990 | Hashimoto ................. | 360/72.1 |
| 5,195,000 | 3/1993 | Suzuki ...................... | 360/72.3 |
| 5,400,150 | 3/1995 | Woo .......................... | 360/72.3 X |

FOREIGN PATENT DOCUMENTS 2227593 6/1990 United Kingdom.

Primary Examiner—Aristotelis M. Psitos
Assistant Examiner—James L. Habermehl
Attorney, Agent, or Firm—Robert E. Bushnell, Esq

[57] ABSTRACT

In an apparatus for reproducing information signals from a record medium, the method for repeated reproduction of the information signals contained in a selected portion of the record medium includes the steps of counting the number of control pulses recovered for the record medium between receipt of a first control signal and receipt of a second control signal in a play mode of operation, thereby producing a count value, reversing the play direction of the record medium and subtracting the number of control pulses recovered, after the second control signal is received, from the count value until the count value is decreased to zero and restarting information signal reproduction in the play mode of operation. A method for repeat reproduction of information signals corresponding to one of information signals located on a predetermined portion of the record medium and information signals reproduced during a predetermined time period is also disclosed.

10 Claims, 2 Drawing Sheets

REPEAT REPRODUCTION METHOD FOR MAGNETIC TAPE

CROSS-REFERENCE TO RELATED APPLICATIONS

This is a continuation of application Ser. No. 07/981,129 filed on Nov. 24, 1992, now abandoned, which is a division and makes reference to, incorporates herein and claims all benefits available under 35 U.S.C. §§119, 120 and 121, from my parent application entitled "Repeat Reproduction Method For Magnetic Tape" earlier filed in the U.S. Patent & Trademark Office on Aug. 28, 1989 and duly assigned U.S. Ser. No. 07/398,888, and my application earlier filed in the Ministry of Industry and Trade of the Republic of Korea on the Dec. 31, 1988 and there assigned U.S. Ser. No. 1988/18088.

FIELD OF THE INVENTION

This invention relates to a repeat reproduction method for magnetic tape and, more particularly, to a method for repeatedly reproducing data from a section of a magnetic tape desired by the user in which audio and/or video signals are recorded.

BACKGROUND OF THE INVENTION

A video tape recorder (VTR) or a tape recorder is a device which records and reproduces audio and/or video signals on a magnetic tape. When one uses such a device for the purpose of linguistic drill or athletic exercise, there is often a need to repeatedly reproduce a certain portion of the recorded tape.

A typical conventional method for this purpose is performed using "endless tape (or drum, sheet)". The endless tape is a fixed-length magnetic tape which is endlessly circulated in the deck. Thus, one can record data in any section of the tape and reproduce that data repeatedly. This method cannot be used to reproduce video signals in video equipment owing to its complicated construction. Moreover, when the amount of recorded data is not equal to the endless tape's recording capacity, the wait time after reproduction increases. Thus, the less data recorded on the endless tape, the longer the wait time becomes. To solve this problem, many solutions, for example, detecting the non-recorded section and jumping to the start of the recorded section of the tape have been proposed. However, these methods are difficult to adapt to the reproduction of video signal.

Another conventional repeat reproduction method was disclosed in Japanese patent laid-open Publication No. Sho 6352356, which describes two decks in line and two magnetic tapes, each of which contains the same data. The two magnetic tapes are loaded in each deck, respectively, and the decks repeatedly reproduce the data in such a way that one tape is rewinding while the other tape is playing, and vice versa.

This method can be adapted to the repeat reproduction of not only audio signals but also video signals, but the method still has some drawbacks. In particular, it is very difficult to synchronize the advancing speeds of two tapes which are moving in opposite directions. The system cost is very high as it has two decks to pick up two tapes, respectively.

BRIEF SUMMARY OF THE INVENTION

Therefore, it is the object of the invention to provide a repeat reproduction method for magnetic tape by which the user can select a desired section, and repeatedly reproduce the data from that section without employing additional circuitry or hardware in the VTR or tape recorder.

To accomplish the above object of the present invention, there is provided an improved repeat reproduction method for magnetic tape comprising the steps of:

(a) counting the number of control pulses picked up from the magnetic tape, wherein the counting step is initiated and the start point of the repeat reproduction section is set in response to a user's demand for repeat reproduction section setting during a playing mode of operation;

(b) checking for the presence or absence of the input of data corresponding to the demand for the repeat reproduction section setting initiated in step (a);

(c) setting the repeat reproduction mode if there is the input of the data corresponding to demand of the repeat reproduction setting in step (b), and determining if the demand for repeat reproduction concerns a prescribed time or a predetermined section;

(d) rewinding the tape for a prescribed time and then reproducing the corresponding recorded signal if the demand for repeat reproduction concerns a prescribed time in step (c), (e) rewinding the tape to the start point of the repeat reproduction section while decreasing the count number in response to received control pulses, and then reproducing the corresponding recorded signal if the demand for repeat reproduction concerns a predetermined section in step (c).

BRIEF DESCRIPTION OF THE DRAWINGS

Many other features, advantages and additional objects of the present invention will be more apparent from the following description in connection with the accompanying drawings in which.

DETAILED DESCRIPTION OF THE INVENTION

Figure 1:
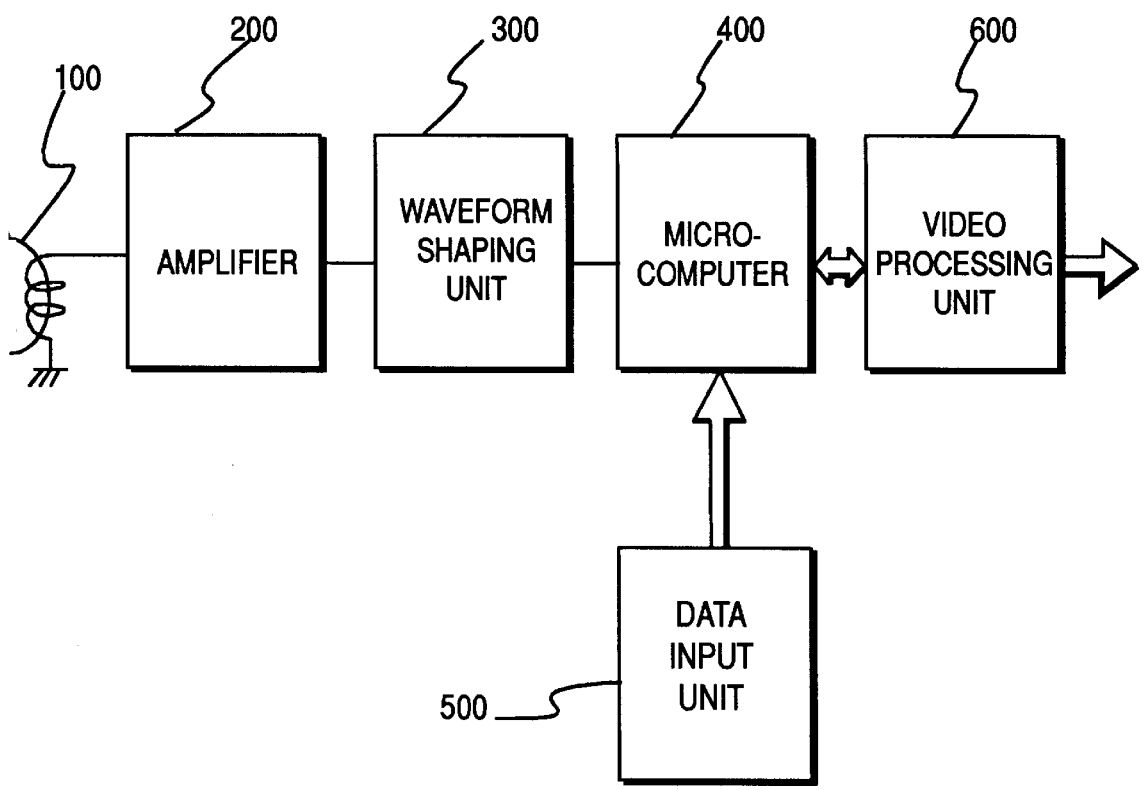
FIG. 1 is a high level block diagram of a VTR suitable for carrying out the method of the present invention.

Referring to FIG. 1, the VTR suitable for carrying out the repeat reproduction method of the present invention includes:

a head 100 for picking up the control pulses recorded on the control track of the video tape;

an amplifier 200 for amplifying the reproduced control pulses to a prescribed level;

a waveform shaping unit 300 for receiving each amplified control pulse as it is input, for converting these control pulses into the form of square waves, and for producing output square waves;

a data input unit 500 for receiving directions designating the function desired by the user;

a video processing unit 600 for processing signals to record or reproduce the audio and/or visual signals on the video tape; and a microcomputer 400 for controlling the advancing of the video tape and for controlling the video processing unit 600, upon receipt of control pulses from the waveform shaping unit 300 and according to the directions input from the data input unit 500.

Figure 2:
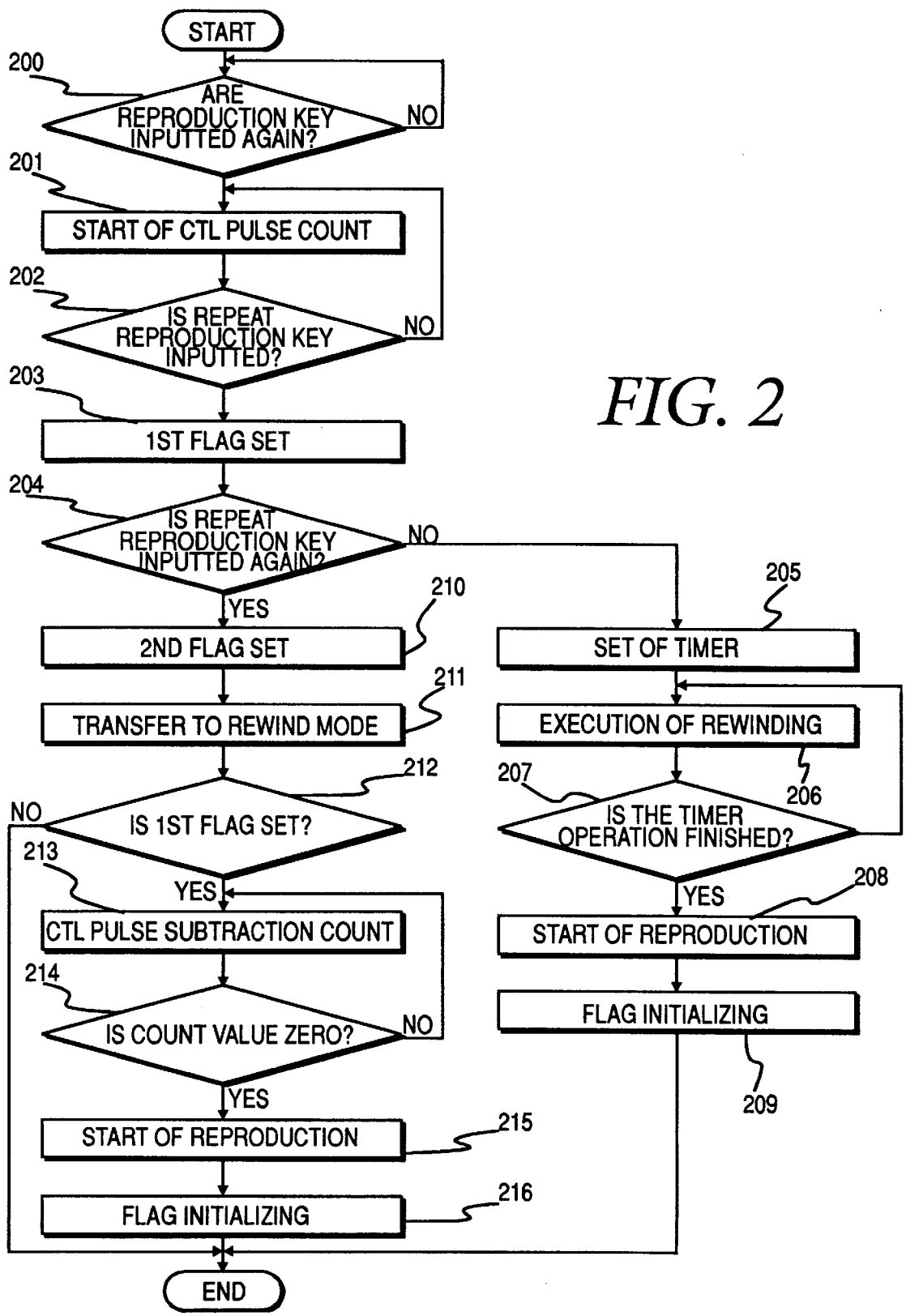
FIG. 2 is a flow chart showing the repeat reproduction method in accordance with the present invention used with the system shown in FIG. 1.

The microcomputer 400 shown in FIG. 1 incorporates a system operation control program for implementing steps corresponding to the steps of the flow chart shown in FIG. 2. The program consists of the following five subroutines:

a 1st subroutine in which the repeat reproduction section is set by starting to count the number of control pulses picked up by head 100, if the data corresponding to the demand for the repeat reproduction section is input, i.e., when play key data is input again through the data input unit 500 during the time when the system is reproducing the data recorded on the video tape in accordance with the input of reproduction key data;

a 2nd subroutine in which a check is made as to whether data corresponding to the demand for repeat reproduction, i.e., data corresponding to a repeat key is input via the data input unit 500;

a 3rd subroutine in which the operation of the system is changed to a repeat reproduction mode, and a judgment is made as to whether the demand for the repeat reproduction concerns a prescribed time or a predetermined section if there is a demand for repeat reproduction in the 2nd subroutine;

a 4th subroutine in which the tape is rewound for the prescribed time and repeatedly reproduced, if the demand for repeat reproduction corresponds to a prescribed time in the 3rd subroutine; and a 5th subroutine in which the tape is rewound to the start position of the repeat reproduction section while counting the subtracted number of control pulses, if the repeat reproduction corresponds to a predetermined section in the 3rd subroutine.

Now, the repeat reproduction process according to the present invention, for the system provided with a microcomputer incorporating the above mentioned system operating program, will be explained in detail with reference to FIGS. 1 and 2.

Referring to FIG. 1, the head (100) picks up the control pulses which have been periodically recorded on the tape control track for the purpose of controlling the running state of the video tape during the play mode and sends the control pulses to the amplifier (200). The amplifier (200) amplifies the received control pulses to a prescribed amplification level and sends them to the wave-form shaping unit (300). The control pulses are then converted into square wave form signals and sent to the microcomputer (400).

The microcomputer (400) thereby controls the tape's running, and also analyzes and processes the data input from the data input unit (500), for controlling the video processing unit (600) so as to execute the system's various operating sequences. It will be noted that the video processing unit 600 can record audio and/or video signal on the video tape, as well as reproduce it.

Now referring to FIGS. 1 and 2, the flow chart for the repeat reproduction operation will be explained in detail.

In controlling the video processing unit 600 to display picked up data from the tape on the TV screen according to the input of play key data, the microcomputer 400 judges whether the user demands to set the repeat reproduction section by checking for the existence of another input of the play key data from data input unit 500 during step 200. It will be appreciated that the VTR is already in the play mode when this determination is made.

When there is another input of play key data in step 200, microcomputer 400 initializes an internal counter (not shown), and increases the count value by 11111 in response to every control pulse picked up from head 100 and transmitted to microcomputer 400 via amplifier 200 and waveform shaping unit 300 during step 201.

After executing the above step 201, the microcomputer 400 judges whether the user demands repeat reproduction of the tape by checking for the presence of repeat key data input from data input unit 500 during step 202.

If there is a first input of repeat key data during step 202, the microcomputer 400 sets the repeat reproduction mode by setting a first internal flag to 11111 during step 203, and then determines whether the user desires to repeat reproduction for the prescribed time or for the predetermined section by checking for the presence of another input of the repeat key data from the data input unit 500 during step 204.

If it is determined that repeat reproduction for the prescribed time is desired from the lack of an additional input of repeat key data during step 204, the microcomputer 400 activates an internal timer (not shown) during step 205, and then controls the video processing unit 600 to rewind the tape during step 206.

After executing step 206, the microcomputer 400 judges whether the prescribed time (for example, five seconds) has lapsed by checking whether the timer has finished the operation and has been reset during step 207.

If it is judged that the prescribed time has lapsed, i.e., that the timer has finished its operation, the microcomputer 400 controls the video processing unit 600 to stop rewinding the video tape and to reproduce and display the program on the tape through, for example, a television set by running it at a normal speed during step 208.

After executing step 208, the microcomputer 400 resets the 1st flag to 11011, and returns to the ordinary mode of operation during step 209.

On the other hand, if there is another input of repeat key data, the microcomputer sets a 2nd flag to 11111 to signify that repeat reproduction of the predetermined section is desired during step 210.

Then, microcomputer 400 changes the system to the rewinding mode during step 211, and redetermines that the present mode is the repeat reproduction mode, thus preventing a false operation of the system, by checking the existence of the 1st flag, before rewinding the tape during step 212.

If the 1st flag is set to 11111 in step 212, the microcomputer 400 causes the tape rewind while decreasing the count value of the internal counter by 11111, from the maximum value counted after step 201 was initiated, for every control pulse picked up by head 100 and received by microcomputer 400 via amplifier 200 and waveform shaping unit 300 during step 213.

Contrary to the above mentioned steps 211 through 213, it is also possible to execute the rewinding of the tape while decreasing the count value in response to each control pulse if the check to prevent false operation in the step 212 is simply omitted.

After executing 213, the microcomputer 400 determines whether the tape has been rewound to the starting point of the repeat reproduction section by checking for coincidence between the subtracted value in the counter and "0" during step 214.

If the count value in the counter is equal to "0" in step 214, the microcomputer 400 controls the video processing unit 600 to run the tape at normal speed and reproduce the program from the tape through, for example, the television set during step 215.

After executing step 215, the microcomputer 400 resets the internal counter, the 1st flag, and the 2nd flag to 11011, and returns to the ordinary mode of operation during step 216.

As described above, the repeat reproduction method for magnetic tape according to the present invention improves the function of VTR or tape recorder, so that the user can repeatedly reproduce an arbitrarily selected section or previously reproduced section, alternatively, by use of control pulses recorded on the tape without additional hardware or circuitry.

While the invention has been described in its preferred embodiment, it is to be understood that changes and variations may be made without departing from the spirit or scope of the present invention as recited in the following claims.

What is claimed:

1. A process of reproducing information stored in an information storage medium by controlling an apparatus, comprising the steps of:

in response to a demand by a user of the storage medium, making a count of control pulses read from the storage medium by the apparatus while the apparatus is reading the storage medium;

determining whether play key data requesting reproduction of information stored on the storage medium has been received by the apparatus subsequent to said demand;

setting the apparatus into a repeat reproduction mode upon a first determination that said play key data has been received by the apparatus subsequent to said demand;

making an interpretation by the apparatus of said repeat data on a basis of a second determination of whether said play key data has been received by the apparatus a second time subsequent to said demand;

enabling one of a first operational mode, initiating movement of the storage medium for a selected period of time, and a second operational mode, initiating movement of the storage medium in dependence upon said count, in dependence upon said second determination;

while in said repeat reproduction mode, creating relative movement between the apparatus and the storage medium to obtain a correspondence between the apparatus and a start point of a section of data stored on said storage medium, with said start point being determined in accordance with whichever of said first operational mode and said second operational mode is enabled in dependence upon said second determination;

reading said information stored on the storage medium, in compliance with said demand.

2. The process of claim 1, further comprised of entering said play key data into the apparatus on both said first time and said second time via a single key of the apparatus.

3. The process of claim 1, further comprised of entering said play key data into the apparatus on both said first time and said second time via repetitive manipulation of a single key of the apparatus.

4. The process of claim 1, further comprising:

while in said repeat reproduction mode, creating said relative movement by initiating said relative movement for said period of time prescribed by said repeat data when said interpretation specifies said first mode; and while in said repeat reproduction mode, creating said relative movement by initiating said relative movement in dependence upon said count to enable access to said information beginning at said start point when said interpretation specifies said second mode.

5. The process of claim 1, further comprising:

performing said step of making an interpretation of said repeat data by deciding between whether said interpretation of said repeat data prescribes a period of time and whether said interpretation of said repeat data prescribes a section of said storage medium;

while in said repeat reproduction mode creating said relative movement when said interpretation of said repeat data prescribes said period of time by moving the storage medium relative to the apparatus for said period of time prescribed by said interpretation of said repeat data; and while in said repeat reproduction mode creating said relative movement when said interpretation of said repeat data prescribes a section of the storage medium by continuing said relative movement in dependence upon said count to enable access to said information beginning at said start point.

6. An apparatus providing reproduction of information stored on information storage media, comprising:

a head positionable to read information and control pulses from a storage medium supported by said apparatus;

a data input unit accommodating entry by a user of play key data and repeat key data requesting reproduction of information from the storage medium; and a controller:

in response to a demand by a user of said apparatus, making a count of control pulses read from the storage medium by the head while the head is reading the storage medium;

determining whether play key data requesting reproduction of information stored on the storage medium has been received by said apparatus subsequent to said demand;

setting the apparatus into a repeat reproduction mode upon a first determination that said play key data has been received by said apparatus subsequent to said demand;

making an interpretation of said repeat data on a basis of a second determination of whether said play key data has been received by said apparatus a second time subsequent to said demand;

enabling one of a first operational mode, initiating relative movement between said head and the storage medium for a selected period of time, and a second operational mode, initiating said relative movement between said head and the storage medium in dependence upon said count, in dependence upon said second determination;

while in said repeat reproduction mode, creating said relative movement between said head and the storage medium to obtain a correspondence between the head and a start point of a section of data stored on said storage medium, with said start point being determined in accordance with whichever of said first operational mode and said second operational mode is enabled in dependence upon said second determination; and a processor driven by said controller to reproduce said information read by said head from the storage medium, in compliance with said demand.

7. The apparatus of claim 6, further comprised of said controller making said interpretation on a basis of said entry of said play key data into the apparatus on both said first time and said second time via a single key of said data input unit.

8. The apparatus of claim 6, further comprised of said controller making said interpretation on a basis of said entry of said play key data into the apparatus on both said first time and said second time via repetitive manipulation of a single key of said data input unit.

9. The apparatus of claim 6, further comprised of said controller:

while said apparatus is in said repeat reproduction mode, creating said relative movement for said period of time prescribed by said repeat data when said interpretation specifies said first mode; and while said apparatus is in said repeat reproduction mode, creating said relative movement in dependence upon said count to enable access to said information beginning at said start point when said interpretation specifies said second mode.

10. The apparatus of claim 6, further comprised of said controller:

performing said step of making an interpretation of said repeat data by deciding between whether said interpretation of said repeat data prescribes a period of time and whether said interpretation of said repeat data prescribes a section of said storage medium;

while said apparatus is in said repeat reproduction mode creating said relative movement when said interpretation of said repeat data prescribes said period of time by moving the storage medium relative to the apparatus for said period of time prescribed by said interpretation of said repeat data; and while said apparatus is in said repeat reproduction mode creating said relative movement when said interpretation of said repeat data prescribes a section of the storage medium by continuing said relative movement in dependence upon said count to enable access to said information beginning at said start point.

* * * * *